United States Patent
Madrid et al.

(10) Patent No.: US 10,782,955 B2
(45) Date of Patent: Sep. 22, 2020

(54) PRE-SHUTDOWN SWAP VERIFICATION

(71) Applicant: FORD GLOBAL TECHNOLOGIES, LLC, Dearborn, MI (US)

(72) Inventors: Daniel Joseph Madrid, Livonia, MI (US); Sangeetha Sangameswaran, Canton, MI (US); Jason Michael Miller, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 442 days.

(21) Appl. No.: 15/396,955

(22) Filed: Jan. 3, 2017

(65) Prior Publication Data
US 2018/0189049 A1    Jul. 5, 2018

(51) Int. Cl.
| | |
|---|---|
| *G06F 9/445* | (2018.01) |
| *G06F 21/57* | (2013.01) |
| *B60R 16/02* | (2006.01) |
| *G06F 8/65* | (2018.01) |
| *G06F 9/4401* | (2018.01) |
| *G06F 21/78* | (2013.01) |
| *G06F 8/61* | (2018.01) |

(52) U.S. Cl.
CPC .............. *G06F 8/65* (2013.01); *G06F 9/4408* (2013.01); *G06F 21/575* (2013.01); *G06F 21/78* (2013.01); *B60R 16/02* (2013.01); *G06F 8/61* (2013.01); *G06F 2221/033* (2013.01)

(58) Field of Classification Search
CPC . G06F 8/61; G06F 8/65; G06F 21/575; G06F 21/552; G06F 21/78; G06F 2221/033; G06F 2221/2111; G06F 11/1438; G06F 11/1441; G06F 16/00; G06F 9/4406; G06F 9/4408; G06F 9/4418; B60R 16/02; H04L 67/12; H04L 67/125; H04L 67/34
USPC .......................................................... 717/173
See application file for complete search history.

(56) References Cited

U.S. PATENT DOCUMENTS

| | | | |
|---|---|---|---|
| 8,813,061 B2 | 8/2014 | Hoffman et al. | |
| 9,128,798 B2 | 9/2015 | Hoffman et al. | |
| 2009/0119657 A1* | 5/2009 | Link, II | G06F 8/64 717/168 |
| 2012/0144177 A1* | 6/2012 | Iyigun et al. | G06F 8/65 713/2 |
| 2013/0031540 A1 | 1/2013 | Throop et al. | |
| 2015/0301821 A1* | 10/2015 | Danne et al. | H04L 67/06 717/169 |

* cited by examiner

*Primary Examiner* — Wei Y Zhen
*Assistant Examiner* — Mohammed N Huda
(74) *Attorney, Agent, or Firm* — Michael J. Spenner; Brooks Kushman P.C.

(57) ABSTRACT

A system includes a first storage, a second storage, and a vehicle electronic control unit (ECU). The ECU is programmed to download a software update received from a server to the first storage, at keyoff, attempt a reboot of the ECU before vehicle shutdown, and confirm the first storage as being active for booting instead of the second storage, responsive to the vehicle ECU successfully booting to the first storage.

16 Claims, 6 Drawing Sheets

PRE-SHUTDOWN SWAP VERIFICATION

TECHNICAL FIELD

Aspects of the disclosure relate to a vehicle software swap verification performed prior to completion of vehicle shutdown.

BACKGROUND

A vehicle may be driven to a dealership and serviced by a technician to update the software of a vehicle component. The technician may utilize a system that tracks the individual software levels of components in the vehicle as well as available software updates. The technician may manually apply the software updates indicated by the system and record any changes back into the system. The software update may be performed while the vehicle is inoperable and in the dealership.

SUMMARY

In a first illustrative embodiment, a system includes a first storage; a second storage; and a vehicle electronic control unit (ECU), programmed to download a software update received from a server to the first storage, at keyoff, attempt a reboot of the ECU before vehicle shutdown, and confirm the first storage as being active for booting instead of the second storage, responsive to the vehicle ECU successfully booting to the first storage.

In a second illustrative embodiment, a system includes a telematics control unit (TCU); and a plurality of vehicle electronic control units (ECUs) in communication with the TCU over a vehicle bus, one of the ECUs programmed to at keyoff, reboot the ECU using a software update received from the TCU to a first storage, and confirm the first storage as active for booting over a second storage, responsive to success of the reboot using the first storage.

In a third illustrative embodiment, a method for over-the-air software updates includes confirming, by a vehicle ECU at keyoff before vehicle shutdown, a first storage as being active for booting instead of a second storage, responsive to the vehicle ECU successfully rebooting to the first storage, the first storage including a downloaded software update received from a remote server

DETAILED DESCRIPTION

Figure 1:
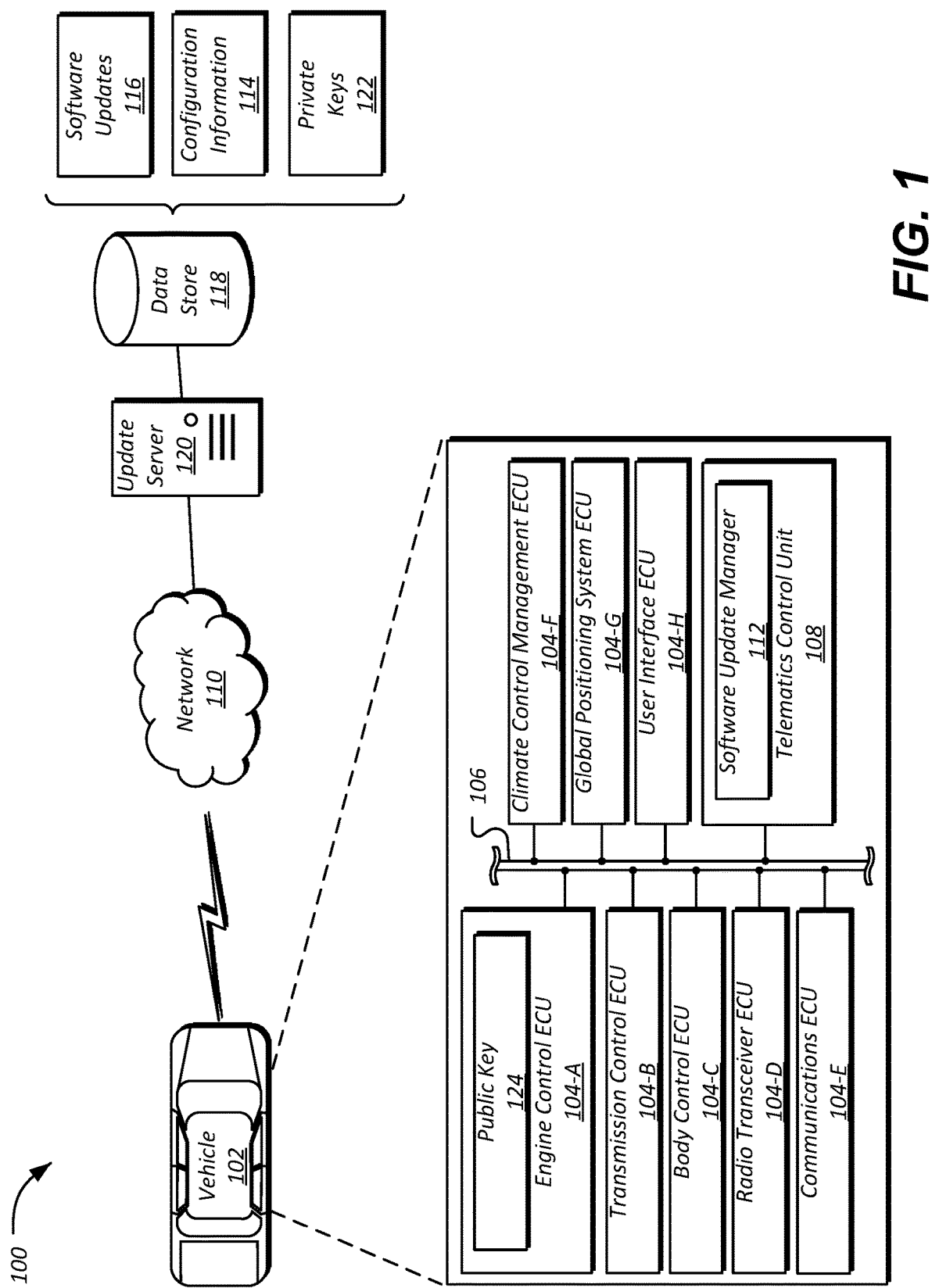
FIG. 1 illustrates an example system for providing software updates to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Software and firmware (referred to herein generally as software) plays an increasingly important role in modern automobiles. This increase in the role of software has caused increased potential for efficiency issues, functionality changes, and security flaws to be addressed in vehicles out in the field. In many modern vehicle systems, vehicle electronic control units (ECUs) are configured with capability to undergo firmware updates after deployment. Updating firmware may be one solution to improving security of software installed to the ECUs of the vehicle. However, improper firmware updates may enable unauthorized or malicious software updates to be installed to the vehicle ECUs. Such inappropriate updates may cause malfunctioning of the vehicle ECUs or unauthorized vehicle operation.

An improved software update procedure may utilize two stages: a first stage in which a software update is downloaded from an update server and provided to a vehicle ECU for installation to an inactive storage, and a second stage in which a swap is performed to allow the vehicle ECU to swap to the installation of the software update to the inactive storage. By using this two-step process, the software update may be performed over time to the inactive storage, without affecting the functioning of the ECU operating using the active storage.

Responsive to the new software being loaded into the inactive storage and verified as ready to swap, the swap function may be performed during an ECU reset event. The reset event may require a small amount of downtime on the vehicle. As one possibility, the swap update of the inactive storage to be the new active storage may written to the ECU at key off. However, if there is an issue with the swap or the new software, the issue may be undetected until the next key on cycle when the customer is getting ready to drive.

An improved swap methodology may be utilized to avoid potential complications with detecting errors at the next key on. At key off before completing the shutdown of the vehicle, the ECU may restart using the new software to ensure that the ECU is working as intended. Then if the ECU restarts properly, the swap can be confirmed before shutting down the ECU again to continue a normal shutdown sequence. If, on the other hand, an issue is identified with the updated software, the ECU may automatically roll back to the previous software and/or notify the telematics control unit of any errors to report back to update server for error handling. Accordingly, by testing the new software at keyoff, potential software issues may be detected before the next key on cycle. Further aspects of the two-stage update procedure are described in detail below.

FIG. 1 illustrates an example system 100 for providing software updates 116 to a vehicle 102. The system 100 may include a telematics control unit 108 in communication over a network 110 with an update server 120 (e.g., via an in-vehicle modem, or via a data channel provided by mobile device of a vehicle occupant). The update server 120 may communicate with a data store 118 configured to maintain software updates 116 for download as well as vehicle configuration information 114 regarding the vehicles 102. The telematics control unit 108 may include a software update manager 112 configured to utilize the telematics control unit 108 to download software updates 116 for installation to the telematics control unit 108 or to other ECUs 104 of the vehicle 102. While an example system 100 is shown in FIG. 1, the example components as illustrated are not intended to be limiting. Indeed, the system 100 may have more or fewer components, and additional or alternative components and/or implementations may be used. As some alternate examples, the functionality of the software update manager 112 may be implemented by another ECU other than the telematics control unit 108, such as an in-vehicle communications ECU (e.g., the Ford SYNC accessory protocol interface module (APIM), a gateway module between vehicle buses 106, etc.).

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104. Or, the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: an engine control ECU 104-A may be configured to provide control of engine operating components; a transmission control ECU 104-B may be configured to utilize sensor data and data from the engine control ECU 104-A to calculate how and when to change gears in the vehicle 102 for optimum performance, fuel economy and shift quality; a body control ECU 104-C may be configured to manage various power control functions such as exterior lighting, interior lighting, keyless entry, remote start, and point of access status verification; a radio transceiver ECU 104-D may be configured to communicate with key fobs, mobile devices, or other local vehicle 102 devices; an entertainment control unit 104-E may be configured to support voice command and BLUETOOTH interfaces with the driver and driver carry-on devices; a climate control management ECU 104-F may be configured to provide control of heating and cooling system components (e.g., compressor clutch, blower fan, temperature sensors, etc.); a global positioning system (GPS) ECU 104-G may be configured to provide vehicle location information; and a human-machine interface (HMI) ECU 104-H may be configured to receive user input via various buttons or other controls, as well as provide vehicle status information to a driver.

The vehicle bus 106 may include various method of communication available between the vehicle ECUs 104. The vehicle bus 106 may also support communication between the telematics control unit 108 and the vehicle ECUs 104. As some non-limiting examples, the vehicle bus 106 may include one or more of a vehicle controller area network (CAN), an Ethernet network, and a media oriented system transfer (MOST) network. It should be noted that the illustrated bus topology is merely an example, and other number and arrangement of vehicle buses 106 may be used.

The telematics control unit 108 (or TCU 108) may include network hardware configured to facilitate communication between the vehicle ECUs 104 and with other devices of the system 100. For example, the telematics control unit 108 may include or utilize an in-vehicle cellular modem to facilitate communication over the communications network 110. The network 110 may include one or more interconnected communication networks such as the Internet, a cable television distribution network, a satellite link network, a local area network, a wide area network, and a telephone network, as some non-limiting examples. As another example, the telematics control unit 108 may utilize one or more of Bluetooth, Wi-Fi, and wired USB network connectivity to facilitate communication with the communications network 110 via the user's smartphone or other mobile device.

The software update manager 112 may be configured to utilize the telematics control unit 108 access the vehicle bus 106 to communicate with the vehicle ECUs 104. When a vehicle 102 is assembled, the vehicle 102 may include various hardware and software components. Upon or after assembly, the software update manager 112 may be configured to query for existence and version information for at least a portion of these hardware and software components of the vehicle ECUs 104 of the vehicle 102.

The software update manager 112 may be further configured to utilize the telematics control unit 108 to communicate with the update server 120 over the network 110. Using the queried information and additional information identifying the specific vehicle 102, the software update manager 112 may communicate via the network 110 to establish an account with the update server 120. The additional information identifying the vehicle 102 may include, as some non-limiting examples, VIN information published on the CAN bus, or subscriber identity module (SIM) information of the modem of the telematics control unit 108 such as international mobile station equipment identity (IMEI). The update server 120 may receive these communications from the vehicles 102, and may maintain a software data store 118 of vehicle configuration information 114 related to the received hardware configurations and software (e.g., firmware, etc.) versions linked to identifiers of the vehicles 102.

The software data store 118 may be further configured to store software updates 116 that may be provided to the vehicle 102. The software updates 116 may include changes to the software or settings of the vehicle 102 to address an issue with the current software or settings, or to provide improved functionality to the current software. The software updates 116 may include, for example, updated configuration settings for one or more vehicle ECUs 104, and/or updated versions of software or firmware to be installed on one or more vehicle ECUs 104. In some cases software updates 116 may include a single section, while in other cases a software updates 116 may be organized into multiple subsections, partitions, or chunks, where all the subsections may be downloaded to complete the overall software update 116 to be installed. In some examples, the software updates 116 may be originated by a vendor (e.g., of the vehicle ECU 104) or originated by the vehicle manufacturer. In some cases, the software updates 116 may be encrypted, while in other cases the software updates 116 may not be encrypted.

The software data store 118 may be further configured to store additional information about the software updates 116. For example, the software data store 118 may be configured to maintain an optional/required flag regarding the software updates 116 allowing the vehicles 102 to determine which software updates 116 are necessary and which are optional. As another example, the software data store 118 may be configured to maintain indications of which vehicle ECUs 104 are associated with which software updates 116. The software data store 118 may further store information indicative of the compatibility of the software updates 116 to vehicle model or configuration. For instance, a storage entry for a software update 116 may indicate that the software update 116 is compatible with a certain make and model of vehicle 102, or that it has a dependency on a version of another vehicle ECU 104 being of a particular software version or versions.

The update server 120 may include one or more devices configured to serve the software updates 116 stored by the data store 118 to the vehicles 102. For example, the update server 120 may be configured to receive the update requests for available software updates 116 from vehicles 102. The update requests may include vehicle information to allow the update server 120 to query the data store 118 for software updates 116 applicable to the vehicle 102 as it is currently configured. The update server 120 may provide, responsive to the update requests, indications of software updates 116 (or the software updates 116 themselves) to update the requesting vehicle 102 that may be downloaded and installed. The update server 120 may be further configured to provide the software updates 116 to devices requesting to download the software updates 116 according to the provided indications.

The software update manager 112 may be further configured to manage the installation of software updates 116. For example, the vehicle 102 may receive a command from a user requesting to check for software updates 116. As another possibility, the vehicle 102 may trigger a periodic check for new software updates 116. When triggered, the vehicle 102 may be configured to send an update request to the update server 120 to inquire whether software updates 116 for the vehicle 102 are available. For instance, the vehicle 102 may query the update server 120 using the vehicle information (or, if the data store 118 maintains current vehicle information, an identifier of the vehicle 102), and may receive a response from the update server 120 indicative of whether new software updates 116 for the vehicle 102 are available (e.g., as links or other identifiers of software updates 116 for the vehicle 102 to download). The determination of whether new updates are available may be based, for example, on the configuration information 114 maintained for the requesting vehicle 102. If the response to the vehicle 102 indicates software updates 116 are available for the vehicle 102, the vehicle 102 may be further configured to utilize the telematics control unit 108 to download the indicated software updates 116, or in other cases queue the software updates 116 to be downloaded.

The software update manager 112 may be further configured to provide a user interface for managing the software updates 116 to the user. For example, the software update manager 112 may be configured to provide a prompt to the user (e.g., via a display or speaker of the user interface module 104-G) informing the user that software updates 116 are available and requesting permission to proceed with installation of the software updates 116. As another possibility, the software update manager 112 may be configured to provide an indication of available updates within the gauge cluster of the vehicle 102 when software updates 116 are available (e.g., downloaded).

To enhance security of the downloading of software updates 116 to the vehicles 102, the system 100 may utilize asymmetric cryptography for validation of received information. For example, the data store 118 may maintain private keys 122 used to sign messages sent from the update server 120 to the vehicles 102, and the vehicle ECUs 104 may maintain public keys 124 that correspond to the private keys 122 that may be used to ensure that the messages sent from the update server 120 are authentically signed. The public key 124 of the engine control ECU 104-A is shown as an example in FIG. 1, but it should be noted that other ECUs 104 of the vehicle 102 also maintain their own respective public keys 124 as well. Notably, the telematics control unit 108 may also have its own respective public key 124 for updates to the telematics control unit 108 as another of the vehicle ECUs, although the public key 124 for the telematics control unit 108 may be applicable to updates to the telematics control unit 108 and not to the other ECUs 104. Variations are possible in which symmetric keys may be used rather than private key 122/public key 124 pairs.

Once the user confirms that the software updates 116 should be installed and/or upon other vehicle triggers such as keyon or keyoff, the software update manager 112 may be configured to initiate various functions useful in support of the updating of the software of the vehicle ECUs 104. For example, the software update manager 112 may be configured to invoke a software update mode by providing a message from the software update manager 112 to the vehicle modules ECUs 104 over the vehicle bus 106. The software update manager 112 may be further configured to provide the software updates 116 to the vehicle ECUs 104 identified by the software updates 116 as recipients of the software updates 116 for validation and installation. The recipient vehicle ECUs 104 may accordingly receive the software updates 116 for compatibility testing and installation.

In some vehicle 102 systems, installation of a software update 116 may require the vehicle 102 to be inoperable, as the storage devices (e.g., a flash memory) utilized by the vehicle ECUs 104 to maintain the executed software cannot both operate and be re-flashed with the software update 116 at the same time. However, in some cases the vehicle ECUs 104 may include multiple storage areas, such that a software update 116 may be installed to one storage area of the vehicle ECU 104 while a current version of the software may be executed from another storage area of the vehicle ECU 104.

Figure 2A:
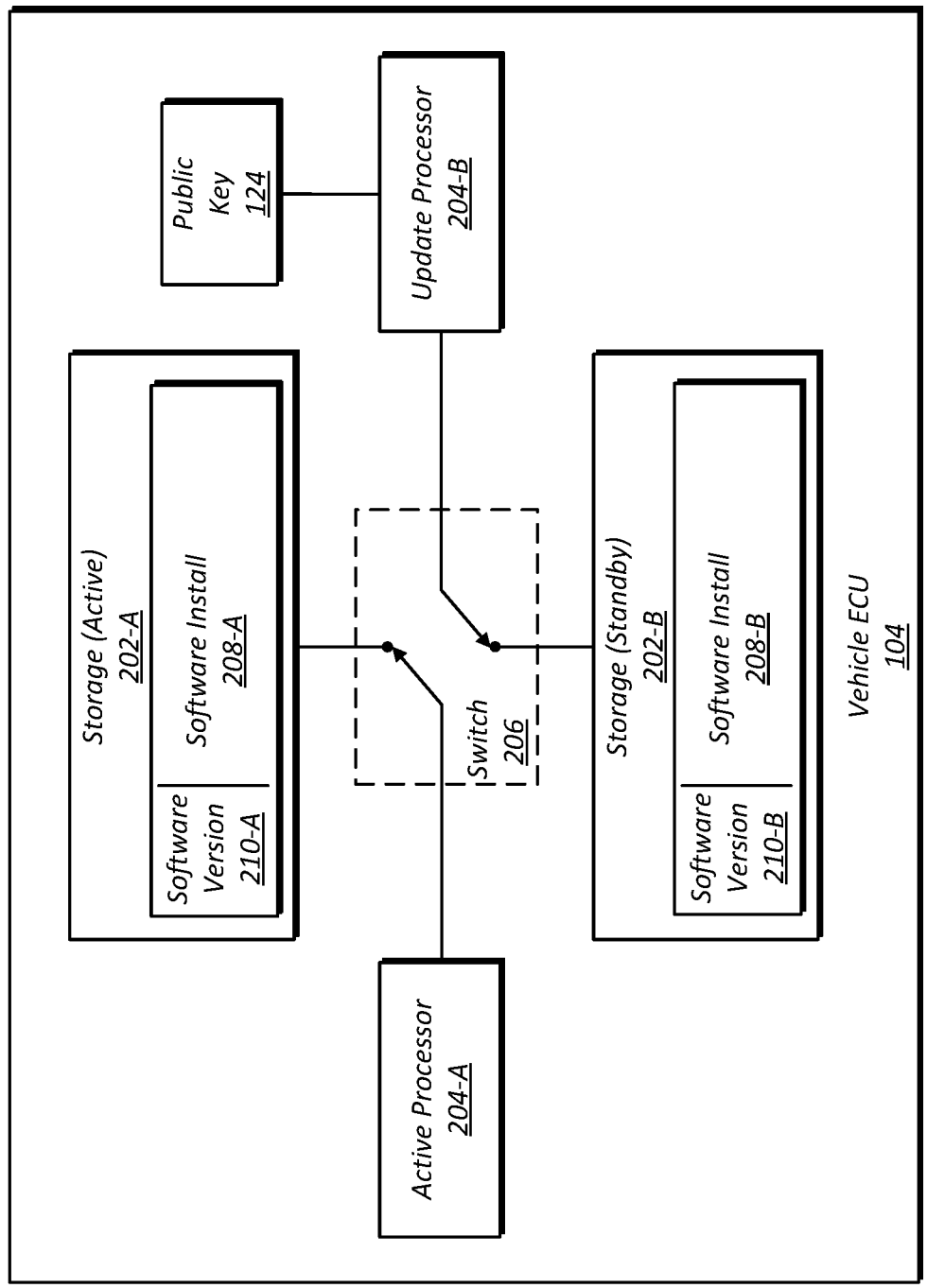
FIGS. 2A and 2B illustrate examples of the programmable memories for installation of software updates to a vehicle ECU.
Figure 2B:
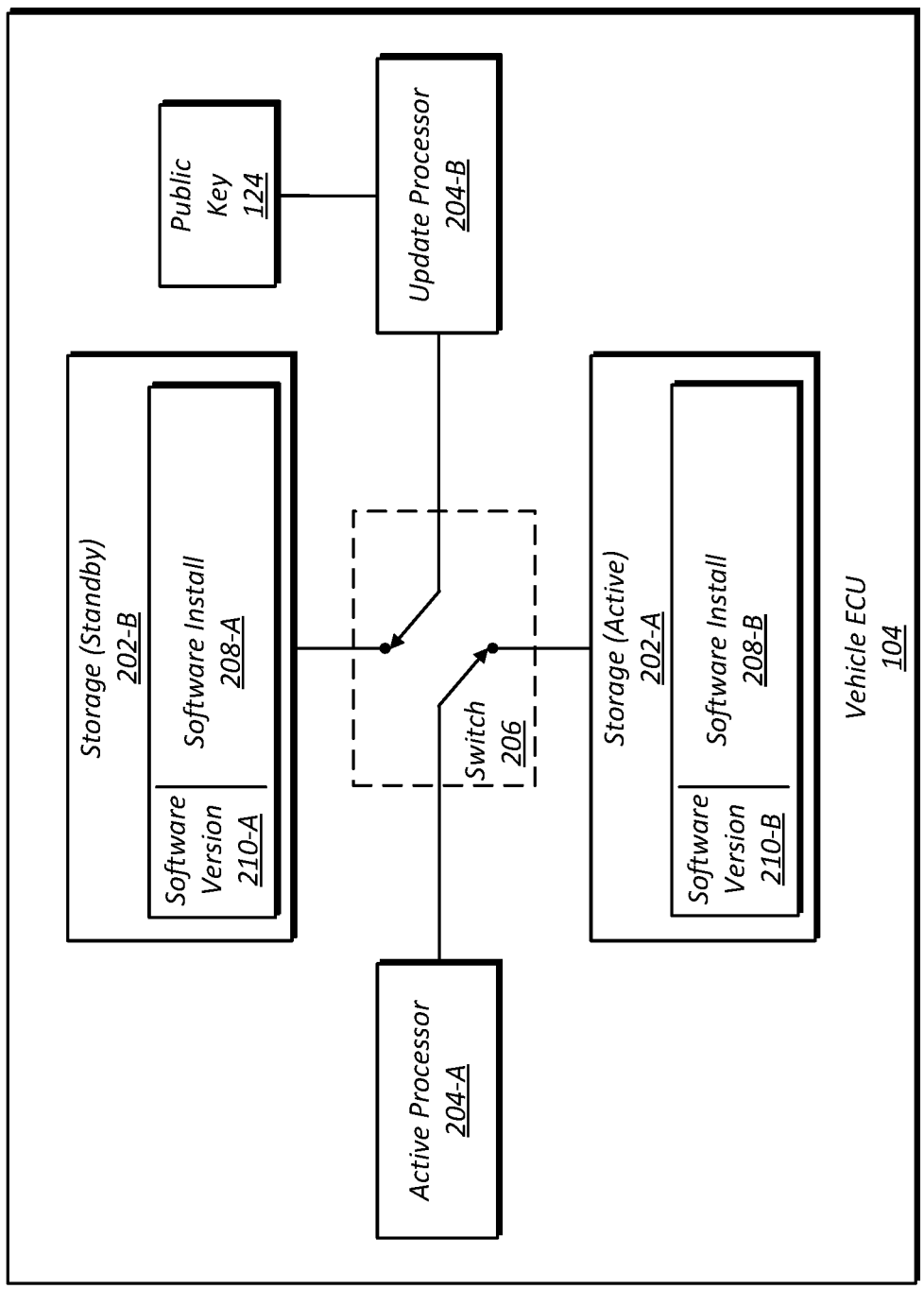

FIG. 2A illustrates an example of the programmable memory circuit 200 for a vehicle ECU 104 having multiple storage 202 areas. As shown, the programmable memory circuit 200 may include an active storage 202-A, an inactive storage 202-B, an active processor 204-A, an update processor 204-B, and a switch 206. The active storage 202-A may include a software installation 208-A at a software version 210-A, and the inactive storage 202-B may include a software installation 208-B at a software version 210-B. The programmable memory circuit 200 may further include or otherwise have access to the public key 124 of the vehicle ECU 104 that may be used to facilitate verification of received software updates 116. In a first state of the switch 206 (as shown in FIG. 2A), the active processor 204-A may be coupled to the active storage 202-A, and the update processor 204-B may be coupled to the inactive storage 202-B. In a second state of the switch 206 (as shown in FIG. 2B), the switch 206 may reverse which storage 202 is the active storage 202-A, and which storage 202 is the inactive storage 202-B. Accordingly, in the second state of the switch 206, active processor 204-A may be coupled to what was formerly the inactive storage 202-B as the new active storage 202-A, and the update processor 204-B may be coupled to what was formerly the active storage 202-A as the new inactive storage 202-B. Thus, by toggling of the switch 206, the programmable memory circuit 200 may switch which of the software installations 208-A or 208-B is to be executed by the active processor 204-A.

For instance, the vehicle ECU 104 may utilize the active processor 204-A to execute the software installation 208-A installed to the active storage 202-A for vehicle 102 operation, while utilizing the update processor 204-B to install the software update 116 as the software installation 208-B of the inactive storage 202-B. In such an example, while the software update 116 is being installed, the vehicle ECU 104 may continue to utilize the active processor 204-A coupled to the storage 202-A to continue to execute the software installation 208-A without interruption.

When the vehicle ECU 104 having installed the software update 116 to the inactive storage 202-B receives confirmation to swap to the installed software update 116, the vehicle ECU 104 may be configured to toggle the switch 206 to cause the inactive storage 202-B to become the new active storage 202-A, and for the current active storage 202-A to become the new inactive storage 202-B. This toggling of the switch 206 may be performed at the next initialization event for the vehicle 102. The initialization event may include, as some non-limiting examples, vehicle keyon, vehicle keyoff, and/or a vehicle ECU 104 re-initialization event.

Figure 2C:
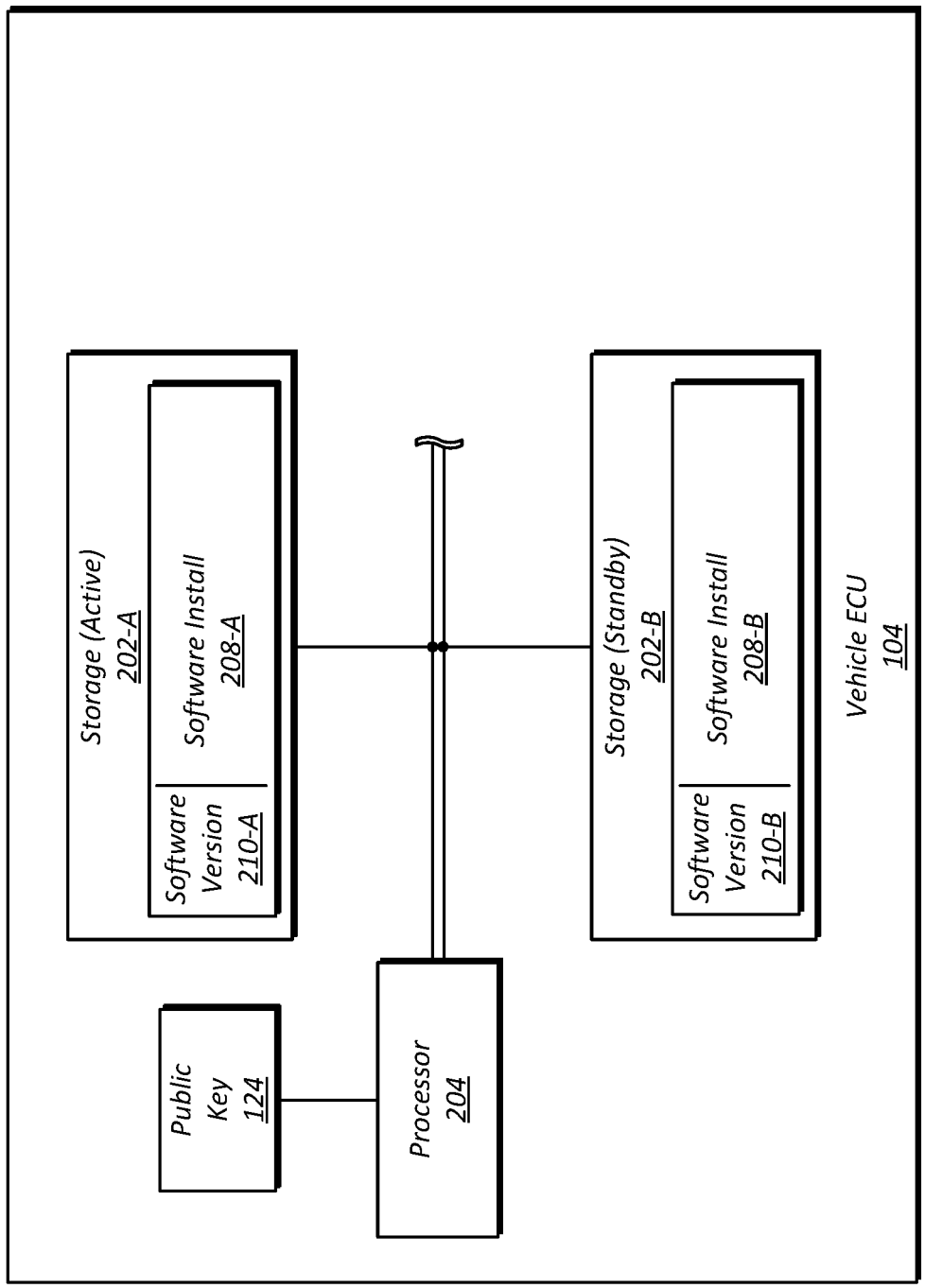
FIGS. 2C and 2D illustrate alternate examples of the programmable memories for installation of software updates to a vehicle ECU.
Figure 2D:
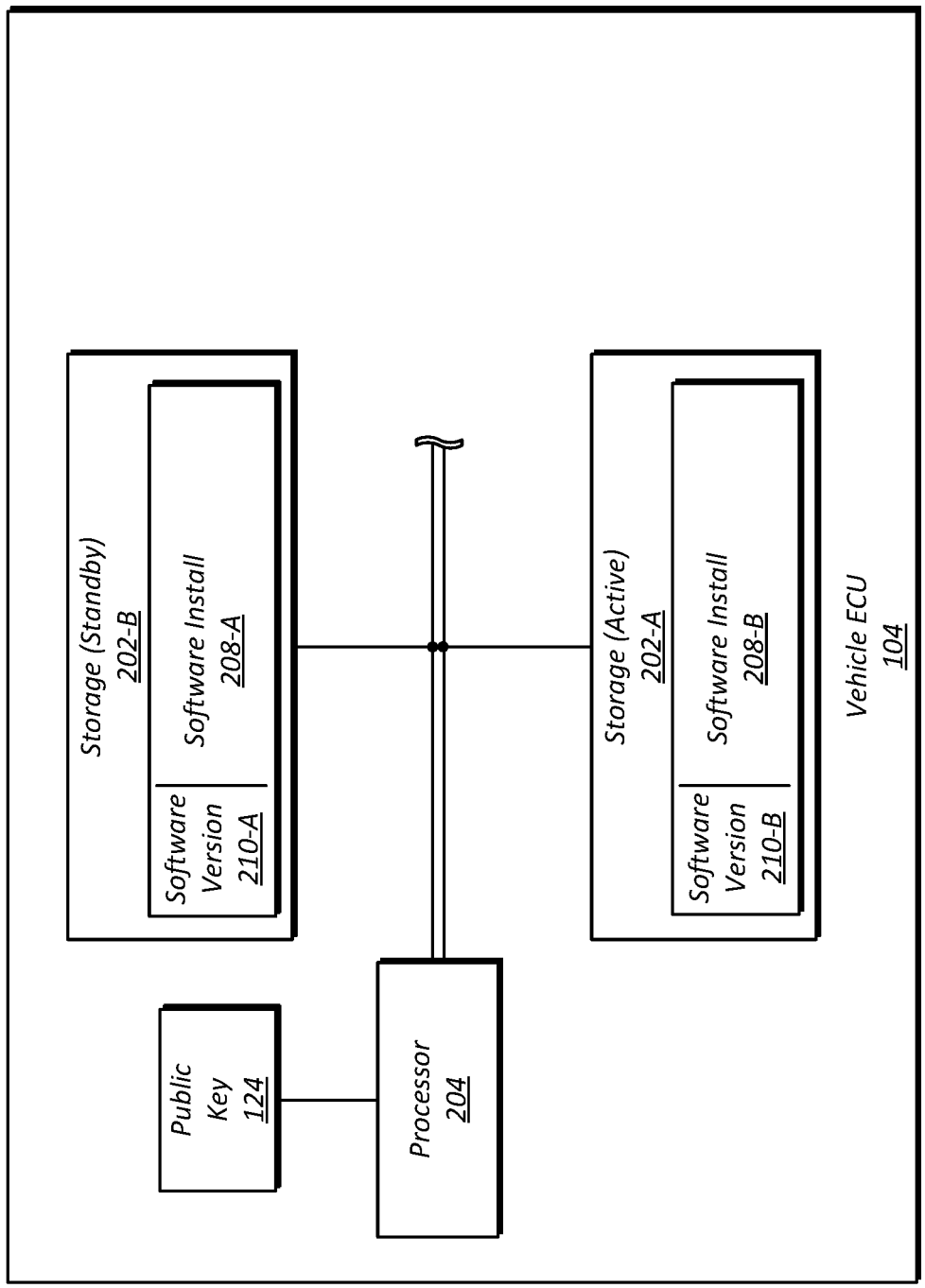

As another example, FIGS. 2C and 2D illustrates a programmable memory circuit 200 including an active storage 202-A, an inactive storage 202-B, and a processor 204. As compared to the processors 204-A and 204-B of FIGS. 2A and 2B, the processor 204 may perform both the execution of the software installation 208-A of the active storage 202-A, and also the updating of the software installation 208-B using the inactive storage 202-B. The programmable memory circuit 200 may further include or otherwise have access to the public key 124 of the vehicle ECU 104 that may be used to facilitate verification of received software updates 116. Similar to the FIGS. 2A and 2B, the processor 204 in the FIG. 2C may switch which storage 202 is the active storage 202-A and which is the inactive storage 202-B based on application of updates.

Or, as a further example (not shown), the storage 202-A may store the software installation 208, and the storage 202-B may store the software update 116. In such an example, the software update 116 may include a differential of updates to be applied to the software installation 208 to update the software installation 208 from the software version 210-A to the software version 210-B. This differential approach to the software update 116 may allow for easier downloading of the software update 116. When the vehicle ECU 104 having received the software update 116 to the inactive storage 202-B receives confirmation to swap to the software update 116, the vehicle ECU 104 may be configured to install the software update 116 to the storage 202-A.

Figure 3:
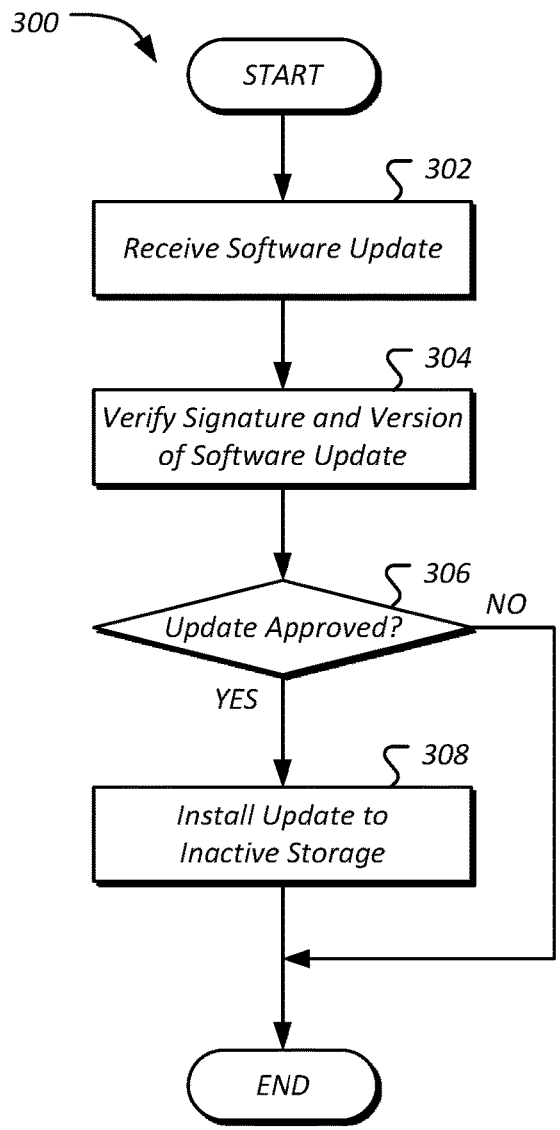
FIG. 3 illustrates an example data flow for installing a software update to inactive storage of one of the vehicle ECUs.

FIG. 3 illustrates an example process 300 for validating and installing software updates 116 to the vehicle ECU 104. The process 300 may be performed, in an example, by the vehicle ECUs 104 in communication with the telematics control unit 108 over the vehicle bus 106.

At operation 302, the vehicle ECU 104 receives the software update 116. In an example, the vehicle ECU 104 receives an update message from the telematics control unit 108 responsive to the update server 120 determining that the vehicle 102 should receive a software update 116 to the vehicle ECU 104.

At operation 304, the vehicle ECU 104 verifies a signature and version of the software update 116. In an example, the vehicle ECU 104 may utilize the public key 124 maintained by the vehicle ECU 104 to ensure that the received software update 116 was provided by the update server 120 using the private key 122 maintained by the data store 118. In another example, the vehicle ECU 104 may confirm that the version of the software update 116 is a greater version number than that software version 210-A of the software installation 208-A to the active storage 202-A of the vehicle ECU 104.

At operation 306, the vehicle ECU 104 determines whether the software update 116 is approved to be installed. In an example, if the verifications at operation 304 are successful, then the software update 116 may be approved for installation. Additionally or alternately, the software update manager 112 may be configured to prompt the user for approval to install the software update 116, and may indicate the approval from the user to install the software update 116 to the vehicle ECU 104. If the software update 116 is approved for installation, control passes to operation 308. Otherwise, the vehicle ECU 104 discards the software update 116 and the process 300 ends.

At operation 308, the vehicle ECU 104 installs the software update 116 to inactive storage 202-B of the vehicle ECU 104. In an example, the vehicle ECU 104 may install the software update 116 to the inactive storage 202-B of the vehicle ECU 104. The vehicle ECU 104 may perform the installation using the update processor 204-B, allowing the active processor 204-A to continue to perform vehicle ECU 104 operations using the active storage 202-A. After operation 308, the process 300 ends.

Figure 4:
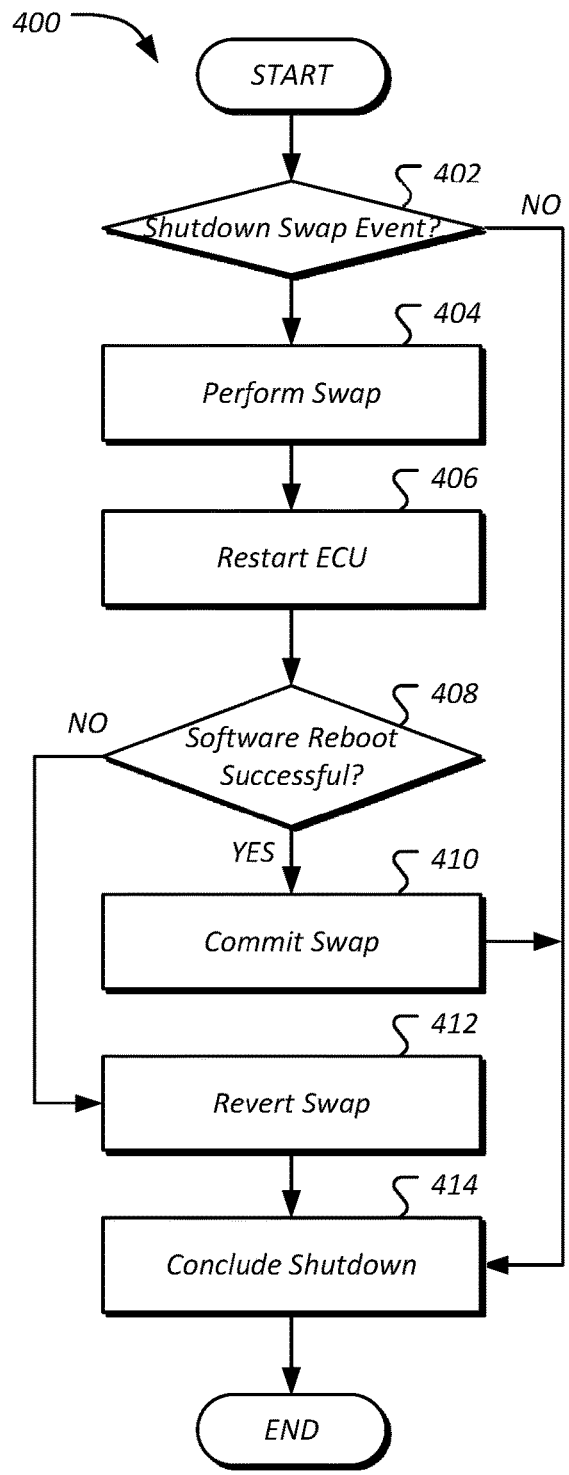
FIG. 4 illustrates an example process for performing swap verification prior to completion of vehicle shutdown.

FIG. 4 illustrates an example process 400 for performing swap verification prior to completion of vehicle 102 shutdown. As with the process 300, the process 400 may be performed, in an example, by the vehicle ECUs 104 in communication with the telematics control unit 108 over the vehicle bus 106.

At operation 402, the vehicle ECU 104 determines whether the swap is ready to be attempted. In an example, the vehicle ECU 104 may determine that the vehicle 102 has initiated a keyoff cycle with a software update 116 installed to inactive storage 202-B of an ECU 104. Initiation of the keyoff may be detected by the vehicle ECU 104 responsive receipt by the vehicle ECU 104 over the vehicle bus 106 of a signal or bus message indicating the keyoff status. In other examples, the update process at keyoff may be controlled by the telematics control unit 108 (or other ECU performing the functions of the software update manager 112), and the telematics control unit 108 (or the other ECU) may identify the keyoff condition via the vehicle bus 106, or may receive a message over the vehicle bus 106 from the vehicle ECU 104 indicating that the vehicle ECU 104 sending the message is ready to attempt a swap. If the swap is ready to be performed by the vehicle ECU 104, control passes to operation 404. Otherwise, control passes to operation 416.

At operation 404, the vehicle ECU 104 performs the swap to the software update 116. In an example, the vehicle ECU 104 may mark in storage 202 of the vehicle ECU 104 that the updated memory storage 202-B is to be temporarily restarted as the active memory storage 202-A. The vehicle ECU 104 may also send a signal or message over the vehicle bus 106 to the other vehicle ECUs 104 requesting that the vehicle 102 shutdown sequence be paused to allow the vehicle ECU 104 to attempt the reboot. In other examples, the update process at keyoff may be controlled by the telematics control unit 108 (or other ECU performing the functions of the software update manager 112), and the signal may be sent by the telematics control unit 108 (or the other ECU) to the vehicle ECUs 104 requesting that the vehicle 102 shutdown sequence be paused to allow the vehicle ECU 104 to attempt the reboot At operation 406, the vehicle ECU 104 initiates a reboot of the vehicle ECU 104.

At operation 408, the vehicle ECU 104 determines whether the reboot was successful. In an example, the vehicle ECU 104 may determine whether the newly activated software installation 208-B successfully booted to the vehicle ECU 104 without error. If so, control passes to operation 410. Otherwise, control passes to operation 412. After the reboot of the vehicle ECU 104, the vehicle ECU 104 may also send a signal or message over the vehicle bus 106 to the other vehicle ECUs 104 indicating that the vehicle 102 shutdown sequence can be continued. In other examples, the update process at keyoff may be controlled by the telematics control unit 108 (or other ECU performing the functions of the software update manager 112), and the signal may be sent by the telematics control unit 108 (or other ECU) to the vehicle ECUs 104 indicating that the vehicle 102 shutdown sequence can be continued.

At operation 410, the vehicle ECU 104 commits the updated version of the software installation 208-B including the software update 116 as being the new active software installation 208-A. Accordingly, the vehicle ECU 104 may set the new install as being the active memory storage 202-A, and may set the formerly-active storage back to an inactive status. After operation 412, control proceeds to operation 414.

At operation 412, the vehicle ECU 104 reverts to the previous active software installation 208-A. Accordingly, the vehicle ECU 104 may discard or rollback the new software installation. Thus, the vehicle ECU 104 may reboot back to the last-known-good install memory storage. In some examples, the vehicle ECU 104 may additionally or alternately notify the telematics control unit 108 of any errors to report back to update server 120 for error handling. After operation 412, control proceeds to operation 414.

At operation 414, the vehicle ECU 104 concludes the vehicle keyoff shutdown. In an example, the vehicle ECUs may discontinue powered operation and/or reduce their respective keyoff loads to that of a keyoff state. Upon the next keyon cycle, the vehicle ECUs 104 may again power up to their active states using the software installed to the active memory storage 202-A. After operation 414, the process 400 ends.

Thus, by validating software updates 116 at keyoff rather than at keyon, the swap can be confirmed before shutting down the ECU 104 again as part of a normal shutdown event. Accordingly, the improved swap methodology may be utilized to avoid potential complications with detecting software compatibility or other errors at the next keyon.

In general, computing systems and/or devices such as the vehicle ECUs 104, telematics control unit 108, and update server 120 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS or QNX operating systems distributed by Research In Motion of Waterloo, Canada, and the Android operating system developed by the Open Handset Alliance.

Computing devices such as the vehicle ECUs 104, telematics control unit 108, and update server 120 generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the data store 118 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the vehicle ECUs 104, telematics control unit 108, software update manager 112, and update server 120 may be such computer program products. In some example, these computer program products may be provided as software that when executed by one or more processors provides the operations described herein. Alternatively, the computer program products may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    first and second non-transitory storages; and
    a vehicle hardware electronic control unit (ECU), programmed to download a software update received from a server to the first storage,
        at keyoff, attempt a reboot of the ECU before vehicle shutdown including to receive, from a telematics control unit (TCU) or another ECU, a first signal over a vehicle bus requesting that the vehicle shutdown be paused to allow the vehicle ECU to attempt the reboot and to receive, from the telematics control unit (TCU) or the other ECU, a second signal over the vehicle bus that the vehicle shutdown be continued after the reboot, and
        confirm the first storage as being active for booting instead of the second storage, responsive to the vehicle ECU successfully booting to the first storage.

2. The system of claim 1, wherein the vehicle ECU is further programmed to retain the second storage as active for booting, responsive to the vehicle ECU unsuccessfully booting to the first storage.

3. The system of claim 1, wherein the vehicle ECU is further programmed to apply the software update to the first storage while the vehicle ECU executes a software installation to the second storage of the vehicle ECU.

4. The system, of claim 1, wherein the vehicle ECU is further programmed to continue shutdown to a keyoff mode after the reboot.

5. The system of claim 1, wherein the vehicle ECU is further programmed to send a signal over a vehicle bus to other vehicle ECUs requesting that the vehicle shutdown be paused to allow the vehicle ECU to attempt the reboot.

6. The system of claim 1, wherein the vehicle ECU is further programmed to send a signal over a vehicle bus to other vehicle ECUs requesting that the vehicle shutdown be continued after the reboot.

7. The system of claim 1, wherein the first storage and the second storage are integral to the vehicle ECU.

8. A system comprising:
    a hardware telematics control unit (TCU); and
    a plurality of vehicle hardware electronic control units (ECUs) in communication with the TCU over a vehicle bus, one of the ECUs programmed to
        at keyoff, reboot the ECU using a software update received from the TCU to a first storage, and
        confirm the first storage as active for booting over a second storage, responsive to success of the reboot using the first storage;
    wherein one or more of:
        (i) the one of the ECUs is further programmed to send a first signal over a vehicle bus to other of the plurality of vehicle ECUs requesting that vehicle shutdown be paused to allow the one of the ECUs to attempt the reboot and to send a second signal over the vehicle bus to the other of the plurality of vehicle ECUs requesting that the vehicle shutdown be continued after the reboot, or
        (ii) the TCU is programmed to send the first signal over the vehicle bus to the plurality of vehicle ECUs requesting that vehicle shutdown be paused to allow the vehicle ECU to attempt the reboot, and to send the second signal over the vehicle bus to the plurality of vehicle ECUs requesting that the vehicle shutdown be continued after the reboot.

9. The system of claim 8, wherein the TCU is further programmed to:
download the software update from a server; and
send the software update over the vehicle bus to the one of the ECUs.

10. The system of claim 8, wherein the vehicle ECU is further programmed to, responsive to an unsuccessful boot of the vehicle ECU to the first storage, retain the second storage as active for booting.

11. The system of claim 10, wherein the TCU is programmed to receive the software update from a remote server, and the vehicle ECU is further programmed to, responsive to an unsuccessful boot of the vehicle ECU using the software update, send a message to the TCU to cause the TCU to report the unsuccessful boot to the remote server.

12. The system of claim 8, wherein the vehicle ECU is further programmed to:
apply the software update to the first storage while the vehicle ECU executes a software installation to the second storage of the vehicle ECU; and
continue shutdown to a keyoff mode after the reboot.

13. A method for over-the-air software updates comprising:
confirming, by a vehicle ECU, a first storage as being active for booting instead of a second storage, responsive to the vehicle ECU successfully rebooting to the first storage at keyoff before vehicle shutdown, the first storage including a downloaded software update received from a remote server, the rebooting including sending a first signal over a vehicle bus to other vehicle ECUs requesting that the vehicle shutdown be paused to allow the vehicle ECU to attempt the reboot and sending a second signal over a vehicle bus to other vehicle ECUs requesting that the vehicle shutdown be continued after the reboot; and
at next keyon after the vehicle shutdown, booting the vehicle ECU using the first storage.

14. The method of claim 13, further comprising sending the software update over a vehicle bus to the vehicle ECU, responsive to downloading the software update from a server by a telematics control unit.

15. The method of claim 13, further comprising retaining the second storage as active for booting, responsive to the vehicle ECU unsuccessfully booting to the first storage.

16. The method of claim 13, further comprising:
applying the software update to the first storage while the vehicle ECU executes a software installation to the second storage of the vehicle ECU; and
continuing shutdown to a keyoff mode after rebooting.

* * * * *